US012112066B2

(12) United States Patent
Wang et al.

(10) Patent No.: US 12,112,066 B2
(45) Date of Patent: Oct. 8, 2024

(54) TECHNIQUES FOR FIRMWARE ENHANCEMENT IN MEMORY DEVICES

(71) Applicant: Micron Technology, Inc., Boise, ID (US)

(72) Inventors: Zhengbo Wang, Shanghai (CN); Jia Sun, Shanghai (CN); Ming Ma, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 14 days.

(21) Appl. No.: 17/812,609

(22) Filed: Jul. 14, 2022

(65) Prior Publication Data

US 2024/0020053 A1    Jan. 18, 2024

(51) Int. Cl.
*G06F 3/06*    (2006.01)
*G06F 12/06*    (2006.01)

(52) U.S. Cl.
CPC .......... *G06F 3/0659* (2013.01); *G06F 3/0604* (2013.01); *G06F 3/0679* (2013.01); *G06F 12/063* (2013.01); *G06F 2212/7201* (2013.01)

(58) Field of Classification Search
CPC .... G06F 3/0659; G06F 3/0604; G06F 3/0679; G06F 12/063; G06F 2212/7201
See application file for complete search history.

(56) References Cited

U.S. PATENT DOCUMENTS

| | | | |
|---|---|---|---|
| 8,868,839 B1 * | 10/2014 | Banerjee | G06F 12/122 |
| | | | 711/133 |
| 10,725,930 B2 * | 7/2020 | Palmer | G06F 16/2246 |
| 2021/0096939 A1 * | 4/2021 | Zhou | G06F 11/0772 |

\* cited by examiner

*Primary Examiner* — Gurtej Bansal
(74) *Attorney, Agent, or Firm* — Holland & Hart LLP

(57) ABSTRACT

Methods, systems, and devices for techniques for firmware enhancement in memory devices are described. A memory system may include a volatile memory device and a non-volatile memory device, which may store a node address mapping. A host system in communication with the memory system may transmit a command instructing the memory system to transfer at least a portion of the node address mapping from the non-volatile memory device to the volatile memory device. The memory system may transmit a response to the command to the host system indicating a status associated with transferring the portion of the node address mapping.

25 Claims, 8 Drawing Sheets

TECHNIQUES FOR FIRMWARE ENHANCEMENT IN MEMORY DEVICES

FIELD OF TECHNOLOGY

The following relates to one or more systems for memory, including techniques for firmware enhancement in memory devices.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
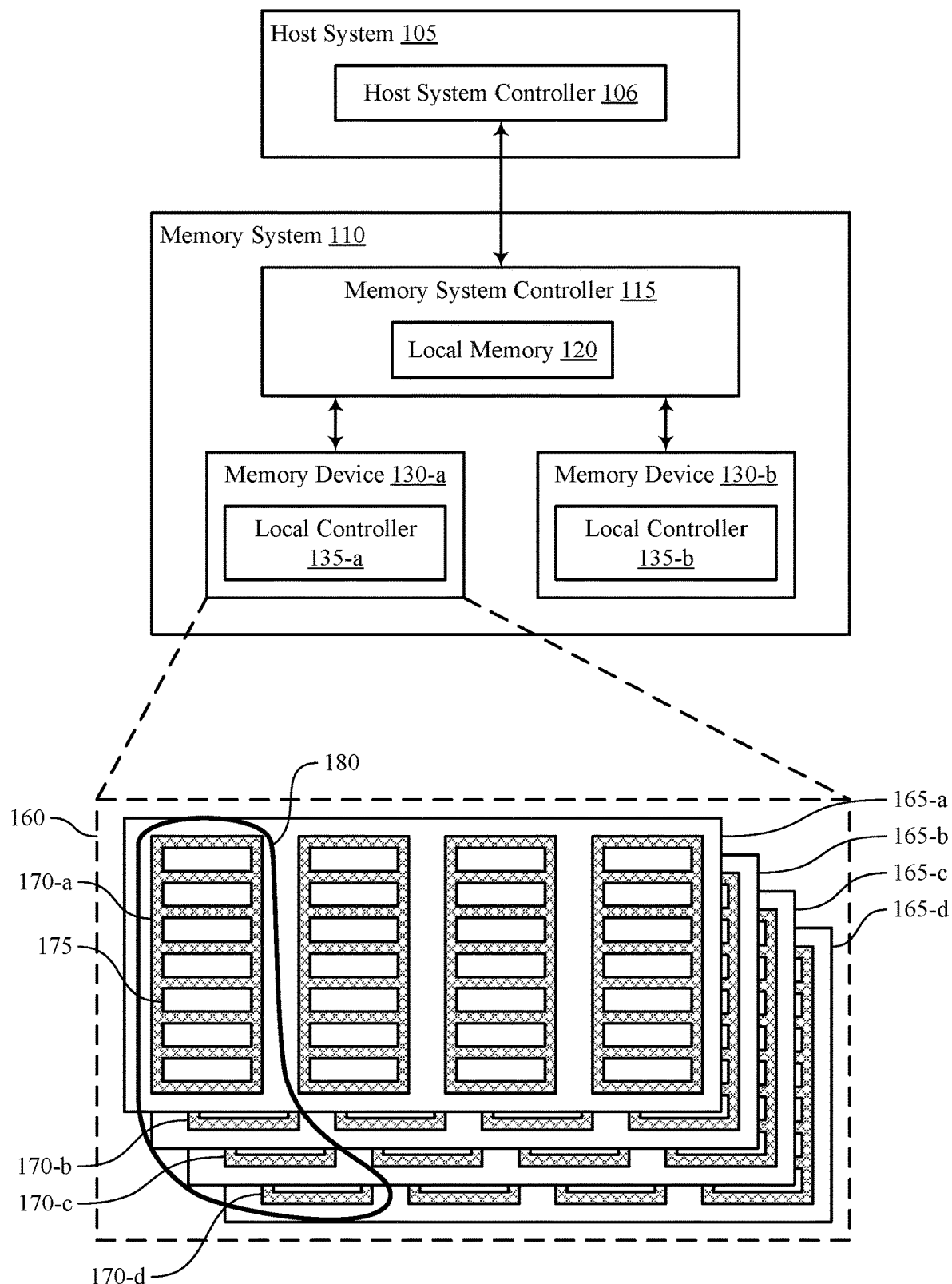
FIG. 1 illustrates an example of a system that supports techniques for firmware enhancement in memory devices in accordance with examples as disclosed herein.

A memory system may be coupled with a host system, which may communicate access commands to the memory system. In some cases, the host system may utilize a set of logical addresses for the access commands, while the memory system may utilize a set of physical addresses (e.g., different from the logical addresses) to execute the access commands. Here, the memory system may rely on node address mapping (e.g., address mapping data such as a node address table (NAT)) to determine the mapping between the logical addresses and the physical addresses for main data storage. The memory system may store the node address mapping (e.g., the node address mapping may indicate a mapping between a node and an address of the data in a data management system) within a memory device (e.g., a non-volatile memory device) of the memory system. In some examples, the memory device may contain a file system layout (e.g., such as a flash-friendly file system (F2FS)) with various areas in the memory device, where the node address mapping may be one area of the various areas. The node address mapping may store data indicating a range of address mappings associated with identifying data in other areas (e.g., node blocks) of the memory device, such as a main area associated with storage data.

If the memory system receives an access command, the memory system may use the node address mapping to identify a portion of the memory device to be accessed (e.g., the access command may indicate the portion). In some cases, an amount of time associated with accessing the node address mapping may impact a latency of the memory system for performing the access command. That is, if the memory system accesses the node address mapping quickly, the latency of the memory system for performing the access command may be decreased, compared to a memory system that accesses the node address mapping less quickly. In some cases, the node address mapping may be stored in a non-volatile memory device of the memory system, which may be associated with increased access latency relative to a different type of memory device (e.g., volatile memory). Techniques for decreasing latency in the memory system may be desired.

Accordingly, a memory system and a host system may implement techniques for firmware enhancement as described herein. For example, the memory system may include a non-volatile memory device and a volatile memory device (e.g., volatile memory such as random access memory (RAM) associated with firmware of the memory system). In some examples, a node address mapping (e.g., a node address table) may initially be stored at the non-volatile memory device. The memory system may support transferring at least a portion of the node address mapping from the non-volatile memory device to the volatile memory device, which may result in relatively faster access of the portion of the node address mapping than if the portion of the node address mapping is stored at the non-volatile memory device. Such techniques may improve the performance of the memory system (e.g., due to the portion of the node address mapping being associated with a relatively high frequency of access). In some examples, the memory system may maintain the portion of the node address mapping in the volatile memory system (e.g., for any quantity of access operations, for example, until a command to transfer the portion from the volatile memory to the non-volatile memory is received). For example, the memory system may initially store the portion of the node address mapping in the non-volatile memory, transfer the portion to the volatile memory, perform one or more operations using the portion (e.g., using the portion to access other parts of the memory system, updating the portion, applying one or more changes to the portion, and the like), and transfer the portion to the non-volatile memory based on receiving the command to transfer the portion to the non-volatile memory (e.g., writing the portion that may or may not be updated to the node address mapping in the volatile memory system). In some cases, a command from the host system may initiate transferring the portion of the node address mapping to the volatile memory device. In some examples, the memory system may transmit a response to the command indicating a status associated with transferring the portion, where the status may be representative of a successful transfer or the inability to initiate the transfer due to existing operations being performed at the memory system (e.g., a busy response or a failed response). In some examples, the techniques may support a host system mode, where the host system selects one or more portions of the node address mapping to transfer to the volatile memory as described herein. Additionally or alternatively, the techniques may support a memory system mode where the memory system may select the one or more portions for transferring to the volatile memory.

Figure 2:
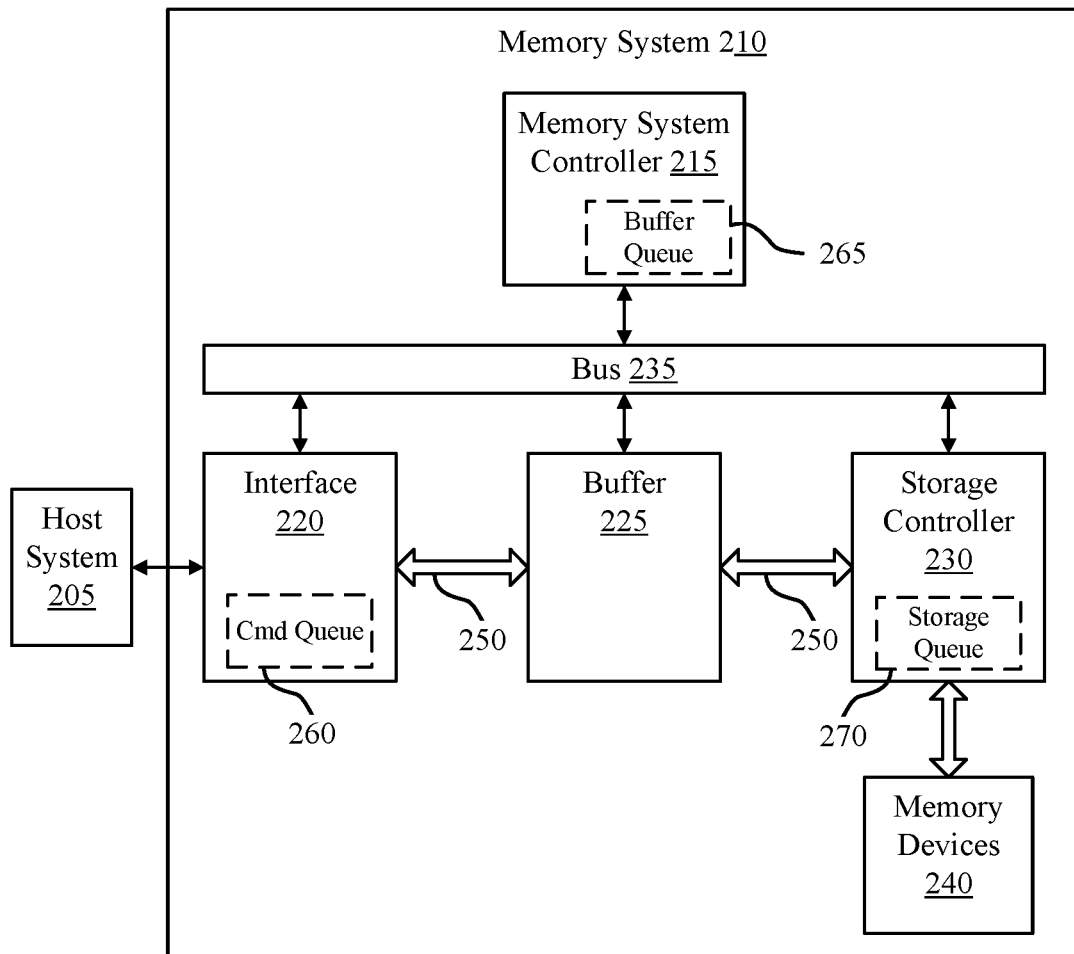
FIG. 2 illustrates an example of a system that supports techniques for firmware enhancement in memory devices in accordance with examples as disclosed herein.

Features of the disclosure are initially described in the context of systems, devices, and circuits with reference to FIGS. 1 through 2. Features of the disclosure are described in the context of systems and process flows with reference to FIGS. 3 through 4. These and other features of the disclosure are further illustrated by and described in the context of apparatus diagrams and flowcharts that relate to techniques for firmware enhancement in memory devices with reference to FIGS. 5 through 8.

FIG. 1 illustrates an example of a system 100 that supports techniques for firmware enhancement in memory devices in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMN interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MHLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180.

In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support techniques for firmware enhancement in memory devices. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may rely on a node address mapping (e.g., address mapping data such as a NAT) to determine a mapping between the logical addresses and the physical addresses for main data storage. The memory system 110 may store the node address mapping (e.g., the node address mapping may indicate a mapping between a node and an address of the data in a data management system) within the memory device 130 (e.g., a non-volatile memory device 130) of the memory system 110. In some examples, the memory device 130 may contain a file system layout (e.g., such as a F2FS) with areas occupying the memory device 130, where the node address mapping may be one area. The node address mapping may store data indicating a range of address mappings associated with identifying data in other areas (e.g., node blocks) of the memory device 130 (e.g., such as a main area associated with storage data). In some cases, the node address mapping may be stored in a non-volatile memory device 130 of the memory system 110, which may be associated with increased access latency relative to a different type (e.g., volatile memory) of memory device 130. Thus, accessing the node address mapping at the non-volatile memory device 130 may further increase the latency associated with performing an access operation on the memory system 110.

The memory system 110 may implement a non-volatile memory device 130 and a volatile memory device 130 associated with firmware of the memory system 110, where the node address mapping may be initially stored at the non-volatile memory device 130 but later transferred to the volatile memory device 130. The memory system 110 may support transferring at least a portion of the node address mapping from the non-volatile memory device 130 to the volatile memory device 130, resulting in faster access of the node address mapping than if the portion of the node address mapping is stored at the non-volatile memory device 130. In some cases, the portion of the node address mapping may be associated with frequent access operations relative to other partitions of the non-volatile memory device 130, thus enabling faster access of the node address mapping may decrease latency of the memory system 110 and improve overall system 100 performance. In some cases, a command from the host system 105 may initiate transferring at least the portion of the node address mapping to the volatile memory device 130. In some examples, the memory system 110 may transmit a response to the command indicating a status associated with transferring the portion, where the status may be representative of a successful transfer or the inability to initiate the transfer due to existing operations being performed at the memory system 110. Accordingly, techniques for transferring the node address mapping from the non-volatile memory device 130 to the volatile memory device 130 may be associated with decreased latency and increased performance at the system 100.

FIG. 2 illustrates an example of a system 200 that supports techniques for firmware enhancement in memory devices in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received in response to the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

The memory system 210 may rely on a node address mapping (e.g., address mapping data such as a NAT) to determine a mapping between the logical addresses and the physical addresses for main data storage. The memory system 210 may store the node address mapping (e.g., the node address mapping may indicate a mapping between a node and an address of the data in a data management system) within the memory device 240 (e.g., a non-volatile memory device 240) of the memory system 210. In some examples, the memory device 240 may contain a file system layout (e.g., such as a F2FS) with areas occupying the memory device 240, where the node address mapping may be one area. The node address mapping may store data indicating a range of address mappings associated with identifying data in other areas (e.g., node blocks) of the memory device 240 (e.g., such as a main area associated with storage data). In some cases, the node address mapping may be stored in a non-volatile memory device 240 of the memory system 210, which may be associated with increased access latency relative to a different type (e.g., volatile memory) of memory device 240. Thus, accessing the node address mapping at the non-volatile memory device 240 may further increase the latency associated with performing an access operation on the memory system 210.

The memory system 210 may implement a non-volatile memory device 240 and a volatile memory device 240 associated with firmware of the memory system 210, where the node address mapping may be initially stored at the non-volatile memory device 240 but later transferred to the volatile memory device 240. The memory system 210 may support transferring at least a portion of the node address mapping from the non-volatile memory device 240 to the volatile memory device 240, resulting in faster access of the node address mapping than if the portion of the node address mapping is stored at the non-volatile memory device 240. In some cases, the portion of the node address mapping may be associated with frequent access operations relative to other partitions of the non-volatile memory device 240, thus enabling faster access of the node address mapping may decrease latency of the memory system 210 and improve overall system 200 performance. In some cases, a command from the host system 205 may initiate transferring at least the portion of the node address mapping to the volatile memory device 240. In some examples, the memory system 210 may transmit a response to the command indicating a status associated with transferring the portion, where the status may be representative of a successful transfer or the inability to initiate the transfer due to existing operations being performed at the memory system 210. Accordingly, techniques for transferring the node address mapping from the non-volatile memory device 240 to the volatile memory device 240 may be associated with decreased latency and increased performance at the system 200.

Figure 3:
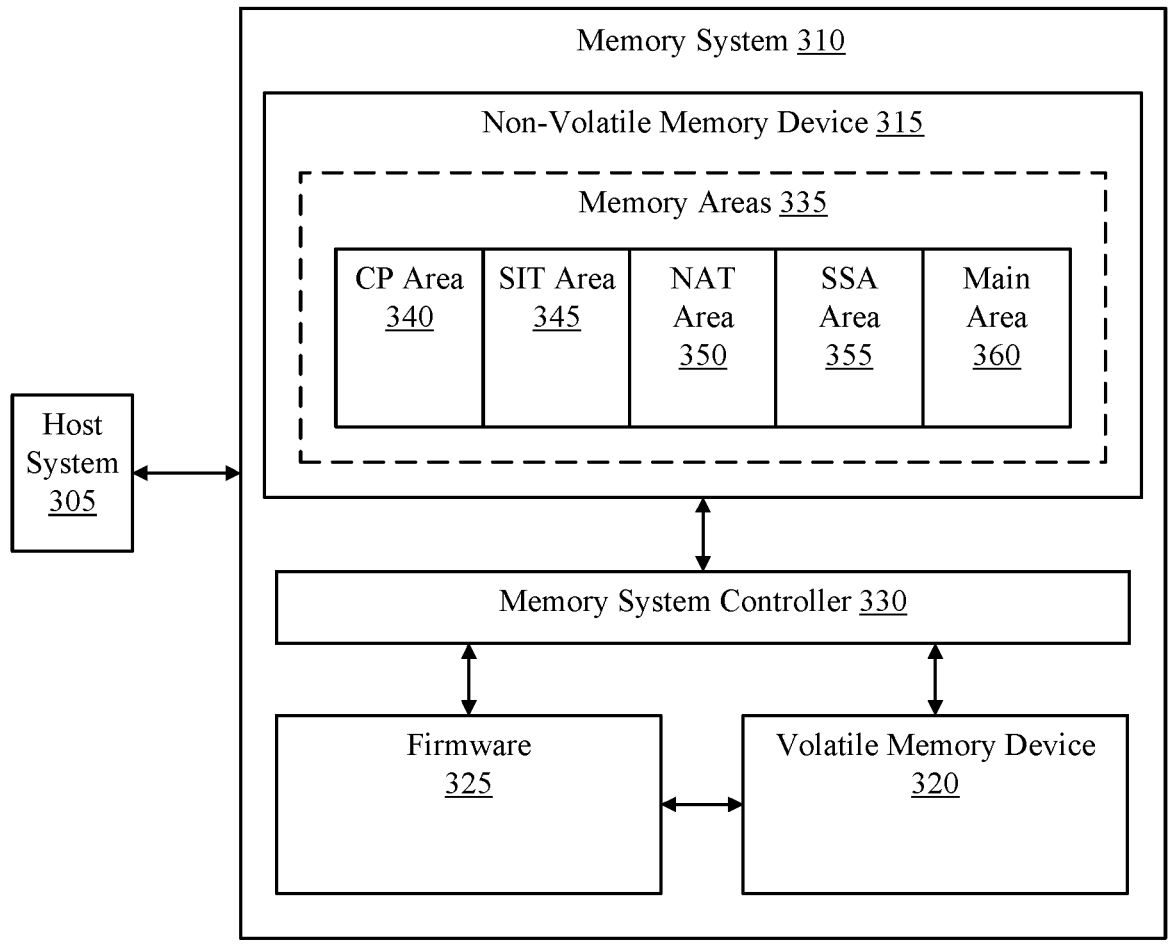
FIG. 3 illustrates an example of a system that supports techniques for firmware enhancement in memory devices in accordance with examples as disclosed herein.

FIG. 3 illustrates an example of a system 300 that supports techniques for firmware enhancement in memory devices in accordance with examples as disclosed herein. The system 300 may be an example for implementing aspects of a system 100 or 200 described with reference to FIGS. 1 and 2, respectively. For example, the memory system 310 and the host system 305 may be examples of the memory system 110 and 210 and the host system 105 and 205, respectively.

The system 300 may include a host system 305 and a memory system 310. The memory system 310 may include a non-volatile memory device 315 (e.g., NAND memory), a volatile memory device 320 (e.g., RAM memory, DRAM memory, or SRAM memory, among other examples of volatile memory), firmware 325, and a memory system controller 330, which may be examples of or implement aspects of components as described herein with reference to FIGS. 1 and 2. In some cases, the non-volatile memory device 315 may be coupled with the memory system controller 330, which may be coupled with the volatile memory device 320, the firmware 325, or a combination thereof. Although illustrated as separate for illustrative clarity, it is to be understood that the system 300 may include components that are combined, arranged in different locations or orientations, or a combination thereof. Additionally or alternatively, the system 300 may have additional types or quantities of components, or some components may be absent from the system 300. In some examples, operations described as being included or performed at one component or system may additionally or alternatively be performed at another component or system.

The memory system controller 330 may be an example of the memory system controller 115 as described with reference to FIG. 1, or an example of the memory system controller 215 as described with reference to FIG. 2. For example, the memory system controller 330 may be operable to execute commands received from the host system 305, control the data path components in the moving of data, and the like, as described herein with reference to FIGS. 1 and 2.

The non-volatile memory device 315 and the volatile memory device 320 may be examples of the memory devices 130 as described with reference to FIG. 1, or an example of the memory devices 240 as described with reference to FIG. 2. The volatile memory device 320 may be associated with the firmware 325 of the memory system 310, where the firmware 325, in communication with the memory system controller 330, may process commands transmitted from host system 305. In some cases, the volatile memory device 320 may be coupled with the firmware 325, whereas in other cases, the volatile memory device 320 may be stored within the firmware 325.

The system 300 may be organized with an internal data management system or a file system layout (e.g., such as a F2FS). In some cases, the F2FS may take into account the characteristics of the memory system 310. The file system layout may indicate an index for each area (e.g., partition) of a set of memory areas 335. As an illustrative example, an area may refer to an assignment of a portion of the non-volatile memory device 315. In some cases, each area may be associated with a range of logical and physical addresses, where the range of logical addresses (e.g., logical address blocks (LBAs)) for each area may be included within the index. Stated alternatively, the F2FS may indicate (e.g., index) the areas and each area may be associated with a respective range of addresses. The memory areas 335 may include a check point (CP) area 340 (e.g., with an LBA range from 512 to 1535 and an identifier of 1), a segment information table (SIT) area 345 (e.g., with an LBA range from 1536 to 3583 and an identifier of 2), a node address table (NAT) area 350 (e.g., with an LBA range from 3584 to 62975 and an identifier of 3), a segment summary area (SSA) area 355 (e.g., with an LBA range from 62976 to 117759 and an identifier of 4), and a main area 360 (e.g., with an LBA range from 117760 to 27921407 and an identifier of 5). Each area may be configured for storing data, nodes, various data types, and the like. In some cases, the identifiers and the LBA ranges for the areas may be stored within an F2FS super block. The CP area 340 may contain checkpoint data such as file information, bitmaps for valid NAT/SIT sets, orphan node lists, and summary entries of current active segments. The SIT area 345 may contain a valid block count and validity bitmap of all blocks in the main area 360. The SSA area 335 may contain entries containing the owner information of the main area 360 data and node blocks. The main area 360 may contain data associated with storage data, data communicated between the host system 305 and the memory system 310, or files, directory data, and their indices. In some examples, the main area 360 may be the area that is allocated to store information for the host system 305 and its contents may be controllable by the host system 305. In some cases, the main area 360 may include a quantity of subareas maintaining a gradient of frequently accessed blocks for each node section and data section.

The NAT area 350 may store data associated with a node address mapping (e.g., such as an L2P table). In some cases, the NAT area 350 may support accessing files at the memory system 310, traversing directories of the memory system 310, allocating new file locations in the memory system 310, and removing files from the memory system 310. The node address mapping may include a mapping between the logical addresses (e.g., LBAs) and the physical addresses for the node blocks in the main area 360. Additionally or alternatively, the node address mapping may include a block address table for the node blocks stored in the main area 360 (e.g., the node address mapping may indicate the locations of node blocks in the main area 360). The memory system 310 may receive access commands from the host system 305 and the memory system 310 may use (e.g., access) the NAT area 350 to execute the access commands by mapping the logical addresses specified in the access commands to the corresponding physical addresses in the memory system 310. For example, the memory system 310 may use the NAT area 350 to identify a node block storing the indicated data of the access command, which may result in a relatively faster access of the data compared to searching the main area 360 without the mapping in the NAT area 350.

In some cases, the host system 305 may transmit a command to the memory system 310 to transfer at least a portion of the NAT area 350 from the non-volatile memory device 315 to the volatile memory device 320, associated with decreasing latency associated with accessing the NAT area 350 in the non-volatile memory device 315. The portion of the NAT area 350 may be moved to the volatile memory device 320 on a more long-term-basis. Portions of the NAT area 350 may be transferred between the non-volatile memory device 315 and the volatile memory device 320 as part of normal access operations. Such transferring can take time and increase the latency of performing the access operations. If frequently-accessed portions of the NAT area 350 are transferred to the volatile memory device 320 and remain in the volatile memory device 320 for longer periods of time, it may reduce the time it takes to perform some access operations because the portion of the NAT area 350 is already in the volatile memory device 320.

In some cases, the command to transfer the portion of the NAT area 350 may be an example of a command unit (e.g., a universal flash storage protocol information unit (UPIU)) and may include a quantity of fields (e.g., byte 0 may correspond to an operation code field, byte 1 may correspond to an F2h field, byte 2 may correspond to an F5h field, byte 3 may correspond to an information ID field, byte 4 may correspond to a cacheop or reserved field, bytes 4 through 6 correspond to a NAT start region, bytes 7 through 9 correspond to a NAT region length, and byte 10 may correspond to a control field). In some examples, the command UPIU may include the cacheop indicating the range of the NAT area 350 to be transmitted to the volatile memory 320. As an illustrative example, when cacheop, =0 the entirety of the range of the NAT area 350 may be delivered; when cacheop=1, the active range of addresses of the NAT area 350 may be specified; and when cacheop=2, the inactive range of addresses of the NAT area 350 may be specified. In some examples, the NAT start region may indicate the starting LBA of the NAT area 350, and the NAT region length may indicate the quantity of LBAs in the NAT area 350.

In some examples, a portion of the NAT area 350 may be accessed more frequently than some other memory areas 335 in the non-volatile memory device 315 or other portions of the NAT area 350. In some implementations, the firmware 325 may identify that the portion of the NAT area 350 is accessed more frequently (e.g., sometimes referred to as hotter) than the other memory areas 335 in the non-volatile memory device 315. In some implementations, the portion of the NAT area 350 may be selected from the NAT area 350 in response to the portion having an access frequency that satisfies (e.g., is greater than) a threshold value for access frequency. In some examples, the firmware 325 or the memory system controller 330 may facilitate the transfer of at least the portion of the NAT to the volatile memory device 320. Therefore, by transferring at least the portion of the NAT area 350 from the non-volatile memory device 315 to the volatile memory device 320, the NAT area 350 in the volatile memory device 320 may be accessed more frequently or with decreased latency due to the faster processing speed of the volatile memory device 320.

As an illustrative example, the firmware 325 may be unable to support transferring the entirety of the NAT area 350 to the volatile memory 320 and may instead transferring the more frequently accessed (e.g., hotter) portion of the NAT area 350. In some implementations, the firmware 325 may transfer the entirety of the NAT area 350 to the volatile memory 320 and remove a less frequently accessed (e.g., colder) portion of the NAT area 350 from the volatile memory 320. In some implementations, the firmware 325 may utilize the knowledge of the LBA range of the NAT area 350 to improve file access for the portion of the NAT area 350 in the volatile memory 320. In another example, the memory system 310 may perform one or more access operations received from the host system 305 using the portion of the NAT area 350 stored in the volatile memory device 320 and may further maintain the portion of the NAT area 350 in the volatile memory device 320 between the one or more access operations. In some examples, accessing the portion of the NAT area 350 in the volatile memory device 320 may improve overall system behavior and small file access significantly (e.g., while having little to no latency impact on mass file access).

In some cases, the command to transfer at least the portion of the NAT area 350 from the non-volatile memory device 315 to the volatile memory device 320 may indicate the size of the portion of the NAT area 350 to transfer. For example, the command may indicate the memory system 310 to transfer the entirety or a portion of the NAT area 350 to the volatile memory device 320. In some implementations, the command may specify a specific range of addresses of the NAT area 350 to transfer to the volatile memory device 320, in response to the host system 305 or the memory system 310 identifying the portion of the NAT area 350 to transfer. The specific range may be selected in response to an indication of a start and a size of the NAT area 350.

The memory system 310 may transmit a response to the host system 305 indicating the status associated with the transferring of the portion of the NAT area 350. In some examples, the status response may be transmitted as a single response UPIU. The status may indicate if the portion of the NAT area 350 has been transferred to the volatile memory device 320 or otherwise. In some cases, a successful status may be determined in response to the portion of the NAT area 350 confirmed (e.g., scheduled) to be transferred to the volatile memory device 320 or having already been transferred to the volatile memory device 320. As an illustrative example, if the requested operation is successful, the command may terminate and the memory system 310 may transmit a status response of GOOD.

In other cases, the memory system 310 may transmit a busy status to the host system 305 as part of the response. In such cases, the busy status may be determined in response to the memory system 310 processing one or more operations associated with one or more commands received prior to the command to transfer the portion of the NAT area 350. Further the busy status may be determined in response to processing the one or more operations over a threshold duration after receiving the command to transfer the portion of the NAT area 350. For example, the busy status may be transmitted to the host system 305 if the memory system 310 is processing the one or more operations after a time has elapsed since receiving the command to transfer the portion of the NAT area 350 to the volatile memory device 320. As an illustrative example, if the memory system 310 is not ready to accept a new command, the memory system 310 may transmit a status response of BUSY. In some cases, the memory system 310 may fail to transfer the portion of the NAT area 350 to the volatile memory device 320. The memory system 310 may transmit a failure status in the response including an indication of one or more parameters causing the failure. The parameters causing the failure to transfer the portion of the NAT area 350 to the volatile memory device 320 may be associated with an illegal request (e.g., an invalid command from the host system 305), a hardware error (e.g., inability to transfer the portion of the NAT area 350 due to operational constraints of the memory system 310), or a power threshold (e.g., the power associated with transferring the portion of the NAT area 350 may be greater than an allowable value for transfer), among other parameters. As an illustrative example, if the memory system 310 fails a status response check from the host system 305, the memory system 310 may transmit a status response of CHECK RESPONSE or FAIL and include the parameter (e.g., ILLEGAL REQUEST, HARDWARE ERROR, UNIT ATTENTION).

In some examples, the host system 305, the memory system 310, or both may detect a NAT range (e.g., a NAT range to select for transferring from non-volatile memory to volatile memory). As an illustrative example, a system may read a partition table header (e.g., LBA1), obtain an LBA range of a user data partition, read a super block of the user data partition, check a filesystem type, and obtain the LBA range of the NAT table. The obtained range may be used for selecting a NAT range for transferring between non-volatile and volatile memory, to indicate the portion of the NAT range to transfer, or both.

In some cases, the system 300 may support a host system mode (e.g., a host mode). For example, in such a mode the host system 305 may select the portion of the NAT area 350 to transfer from the non-volatile memory device 315 to the volatile memory device 320. The host system 305 may identify the NAT area 350 from within the non-volatile memory device 315 and select the portion or the entirety of the NAT area 350 to transfer to the volatile memory device 320. For example, the host system 305 may run an algorithm to determine the portion of the NAT area 350 to transfer to the volatile memory device 320 prior to transmitting the command to the memory system 310 (e.g., received at the firmware 325) to transfer the determined portion of the NAT area 350 to the volatile memory device 320. In some examples, the command may indicate that the working mode is a host control mode (e.g., a NAT control mode field may indicate a 00) and the memory system 310 may autonomously select the portions of the NAT area 350 for transferring between the volatile memory device 320 and the non-volatile device 315 (e.g., without receiving further commands from the host system 305). In some implementations, the algorithm may identify the portion of the NAT area 350 in response to the portion exceeding a threshold value for access frequency and transmit an identification of the portion of the NAT area 350 as part of the command to transfer the portion of the NAT area 350 to the volatile memory device 320. As an illustrative example, the host system 305 may scan the memory system 310 and fill the command UPIU with one of the fields, transfer the command UPIU to the firmware 325, scan the memory system 310 and fill the command UPIU with one of the fields, transfer the command UPIU to the firmware 325, and the firmware 325 may transfer a portion of the NAT specified by the command UPIU to the volatile memory 320.

In some cases, the system 300 may support a memory system mode (e.g., a device mode). For example, in such a mode the memory system 310 may select the portion of the NAT area 350 to transfer from the non-volatile memory device 315 to the volatile memory device 320. The memory system 310 may identify the NAT area 350 from within the non-volatile memory device 315 and select the portion or the entirety of the NAT area 350 to transfer to the volatile memory device 320. For example, the memory system 310 may run the algorithm to determine the portion of the NAT area 350 to transfer to the volatile memory device 320 upon receiving the command from the host system 305 (e.g., received at the firmware 325) to transfer the portion of the NAT area 350 to the volatile memory device 320. In some examples, in the memory system mode, the command may indicate that the working mode is a device control mode (e.g., a NAT control mode field may indicate a 01) and the memory system 310 may autonomously select the portions of the NAT area 350 for transferring between the volatile memory device 320 and the non-volatile device 315 (e.g., without receiving further commands from the host system 305). In some implementations, the algorithm may identify the portion of the NAT area 350 in response to the portion satisfying (e.g., exceeding) a threshold value for access frequency and transfer the most frequently accessed portion of the NAT area 350 to the volatile memory device 320 in response to identifying. As an illustrative example, the host system 305 may scan the NAT area 350 and fill the command UPIU with one of the fields, transfer the command UPIU to the firmware 325, and the firmware 325 may use the algorithm to increase the access speed to the NAT area 350 or transmit a portion of the NAT area 350 to the volatile memory 320. In some examples of the memory system mode, the host system 305 may send a command for the memory system 310 to transfer at least a portion of the NAT area 350 and the memory system 310 select that portion based on receiving the command.

Figure 4:
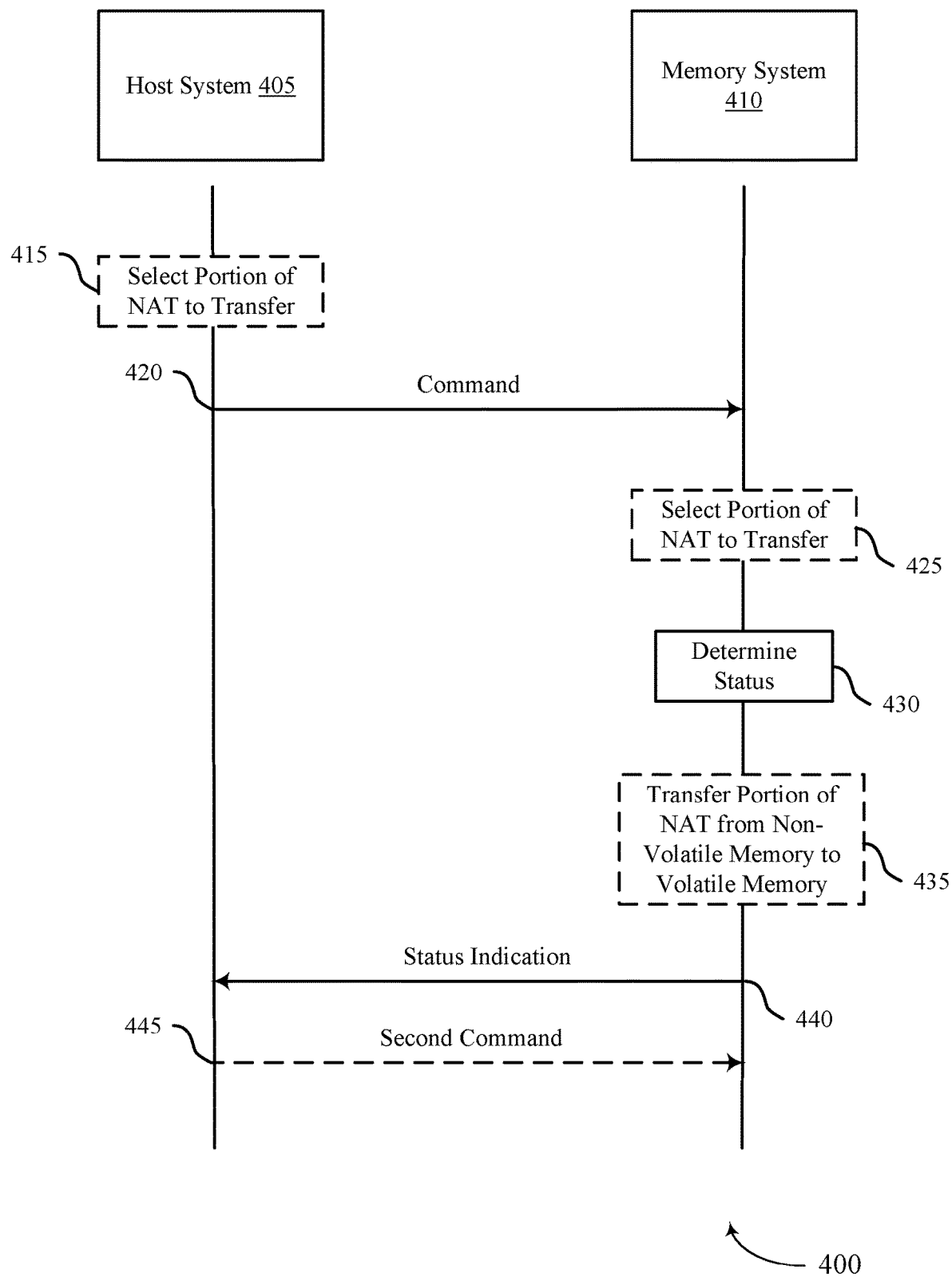
FIG. 4 illustrates an example of a process diagram that supports techniques for firmware enhancement in memory devices in accordance with examples as disclosed herein.

FIG. 4 illustrates an example of a process diagram 400 that supports techniques for firmware enhancement in memory devices in accordance with examples as disclosed herein. The process diagram 400 may be an example for implementing aspects or operations of a system 100, 200, or 300 as described with reference to FIGS. 1, 2, and 3, respectively. For example, the process diagram 400 may depict operations at a memory system 410 and a host system 405, which may be examples of memory systems and host systems as described with reference to FIGS. 1-3.

In the following description of the process diagram 400, the operations between the memory system 410 and the host system 405 may be performed in different orders or at different times. Certain operations may also be left out of the process flow, or other operations may be added to the process flow. While the memory system 410 and the host system 405 are shown performing the operations of process diagram 400, other components of the system 100, 200, or 300 may be used to perform these operations, as described with reference to FIGS. 1, 2, and 3, respectively.

The memory system 410 may include a non-volatile memory device (e.g., NAND memory), a volatile memory device (e.g., RAM memory, DRAM memory, or SRAM memory, among other examples of volatile memory), firmware, and a memory system controller, which may be examples of or implement aspects of components as described herein with reference to FIGS. 1, 2, and 3. The non-volatile memory device may include a node address mapping (e.g., a node address table (NAT)) which contains a mapping between the logical addresses (e.g., logical block addresses (LBAs)) and the physical addresses for a main storage area of the non-volatile memory device. For example, the memory system 410 may receive access commands from the host system 405 and the memory system 410 may use (e.g., access) the NAT to execute the access commands by mapping the logical addresses specified in the access commands to the corresponding physical addresses in the memory system 410.

Additionally or alternatively, the process diagram 400 may have additional types or quantities of components, and/or some components may be absent from the process diagram 400. In some examples, operations described as being included or performed at one component or system may additionally or alternatively be performed at another component or system.

In some examples, at 415, a portion of the NAT to transfer from the non-volatile memory device to the volatile memory device is selected. For example, the host system 405 may select at least a portion of the NAT to transfer from the non-volatile memory device to the volatile memory device. The host system 405 may identify the NAT from within the non-volatile memory device and select the portion or the entirety of the NAT to transfer to the volatile memory device. For example, the host system 405 may run an algorithm to determine the portion of the NAT in the non-volatile memory device to transfer to the volatile memory device, prior to transmitting a command to the memory system 410 to transfer the determined portion of the NAT from the non-volatile memory device to the volatile memory device. In some implementations, the algorithm may identify the portion of the NAT in response to the portion exceeding a threshold value for access frequency and transmit an identification of the most frequently accessed portion of the NAT as part of the command to transfer the portion of the NAT from the non-volatile memory device to the volatile memory device.

At 420, a command may be transmitted. For example, the host system 405 may transmit the command to the memory system 410. The command may indicate for the memory system 410 to transfer the portion of the NAT from the non-volatile memory device to the volatile memory device. In some cases, the command may indicate the size of the portion of the NAT to transfer. For example, the command may indicate the memory system 410 to transfer the entirety or a portion of the NAT to the volatile memory device. In some implementations, the command may indicate a specific range of addresses of the NAT to transfer to the volatile memory device, in response to the host system 405 or the memory system 410 identifying the portion of the NAT to transfer. The specific range of addresses may be selected in response to an indication of a start and a size of the NAT. In some cases, the command may indicate a type of information (e.g., an information ID) associated with the portion of the NAT.

In some examples, at 425, a portion of the NAT may be selected. For example, the memory system 410 may select the portion of the NAT to transfer from the non-volatile memory device to the volatile memory device (e.g., in a memory system mode as described with reference to FIG. 3). The memory system 410 may identify the NAT from within the non-volatile memory device and select the portion or the entirety of the NAT to transfer to the volatile memory device. For example, the memory system 410 may run the algorithm to determine the portion of the NAT to transfer to the volatile memory device upon receiving the command at 410 from the host system 405. In some implementations, the algorithm may identify the portion of the NAT in response to the portion exceeding a threshold value for access frequency and select the portion of the NAT for transfer to the volatile memory device. In some examples, the firmware at the memory system 410 may run the algorithm.

At 430, a status may be determined. For example, the memory system 410 may determine a status associated with transferring the portion of the NAT from the non-volatile memory device to the volatile memory device. The status may be a successful status, a busy status, or a failed status. For example, the successful status may indicate the portion of the NAT has already been transferred, or has not yet been transferred but is confirmed for transfer within a threshold time duration. The busy status may be determined in response to the memory system 410 processing one or more operations associated with one or more access commands, where the access commands may have been received from the host system 405 prior to 410. Further, the busy status may be determined in response to processing the one or more operations over a threshold duration after receiving the command at 410 from the host system 405. For example, the busy status may be determined if the memory system 410 is still processing the one or more operations after a specified time has elapsed since receiving the command at 410. In some cases, the busy status may additionally or alternative indicate the portion of the NAT will be transferred in the future. The failure status may indicate the portion of the NAT cannot be transferred and a reasoning (e.g., a parameter) for the failure. The failure may be caused by an illegal request (e.g., an invalid command from the host system 405), a hardware error (e.g., inability to transfer the portion of the NAT due to operational constraints of the memory system 410), or a power threshold (e.g., the power associated with transferring the portion of the NAT may be greater than an threshold value for transfer), among other reasons. In some cases, determining the status may occur at either 430 or 435 (e.g., concurrently or subsequent to the operations at 425).

In some examples, at 435, a portion may be transferred. For example, the memory system 410 may transfer the portion or the entirety of the NAT from the non-volatile memory device to the volatile memory device. In some implementations, transferring at least the portion of the NAT from the non-volatile memory device to the volatile memory device may include removing at least the portion of the NAT from the non-volatile memory device prior to transferring to the volatile memory device. In some examples, the firmware or the memory system controller of the memory system 410 may facilitate the transfer of the portion of the NAT to the volatile memory device. Transferring the portion of the NAT to the volatile memory device may be in response to the command at 420 or in response to a determination to transfer the portion of the NAT by the memory system 410. In some cases, the portion of the NAT may be transferred in response to the successful status determined at 430. In cases where the busy status or the failed status was determined at 430, the memory system 410 may not transfer the portion of the NAT to the volatile memory device and may instead retain the portion of the NAT in the non-volatile memory device.

At 440, an indication of the status may be transmitted. For example, the memory system 410 may transmit an indication of the status to the host system 405. The indication of the status may be determined by the memory system 410 at 430 and transmitted to the host system 405 in response to the determination by the memory system 410. The status may be a successful status, a busy status, or a failed status as described above.

In some cases, after 440, the host system 405 may transmit an access command to the memory system 410 to perform one or more access operations. The memory system 410 may use the portion of the NAT in the volatile memory device to execute the one or more access operations. Additionally or alternatively, the memory system 410 may maintain the portion of the NAT in the volatile memory device between the one or more access operations. Performing the one or more access operations using the portion of the NAT in the volatile memory device may enable faster read and write operations, decrease latency at the memory system 410, and improve overall system performance, especially if compared with performing the one or more access operations using the NAT in the non-volatile memory device.

In some examples, at 445, a second command may be transmitted. For example, the host system 405 may transmit a second command to the memory system 410. In some cases, the second command may instruct the memory system 410 to remove a second portion of the NAT from the volatile memory device. The second portion of the NAT may be a different or the same portion of the NAT previously described at steps 415 through 440. In some cases, the memory system 410 may remove the second portion of the NAT from the volatile memory device in response to receiving the second command. In some implementations, the second portion of the NAT may be transferred back (e.g., rewritten or updated or both) to the non-volatile memory device in response to removing the second portion from the volatile memory device. In some cases, the second command may indicate the size of the second portion of the NAT to remove. For example, the second command may indicate the memory system 410 to remove the entirety of the portion of the NAT in the volatile memory device, or a subsection of the portion of the NAT in the non-volatile memory device. In some implementations, the second command may specify a specific range of addresses of the NAT to remove from the volatile memory device, in response to the host system 405 or the memory system 410 identifying the second portion of the NAT to remove.

In some cases, the second command may not instruct the memory system 410 to remove a second portion of the NAT from the volatile memory device. In such cases, the second command may be transmitted from the host system 405 to the memory system 410 in response to receiving a failed status indication from the memory system 410 at 430. In this case, the second command may instruct the memory system 410 to retry transferring the portion of the NAT to the volatile memory device.

Aspects of the process flow 400 may be implemented by a controller, among other components. Additionally or alternatively, aspects of the process flow 400 may be implemented as instructions stored in memory (e.g., firmware stored in a memory coupled with a controller). For example, the instructions, when executed by a controller may cause the controller to perform the operations of the process flow 400.

Figure 5:
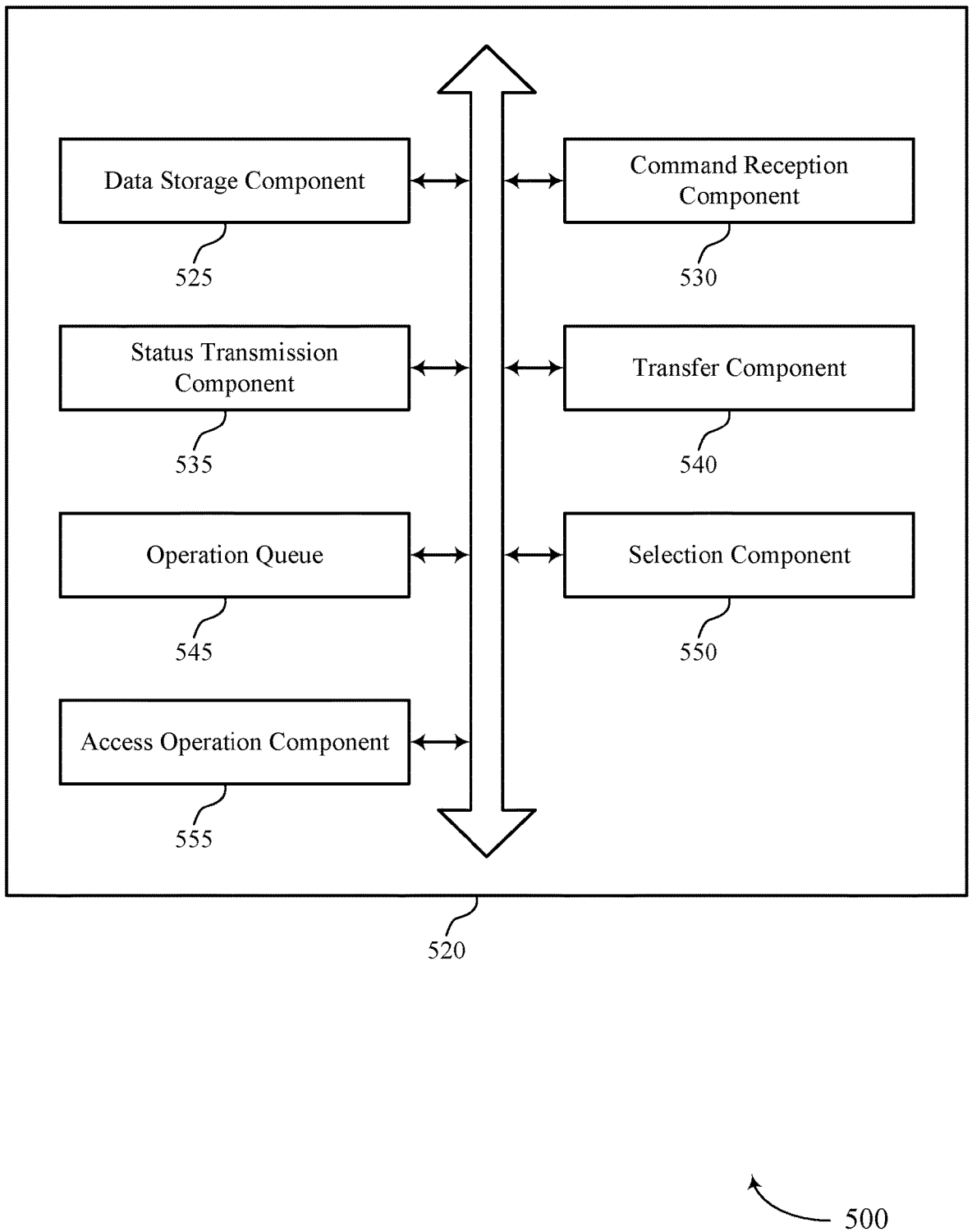
FIG. 5 shows a block diagram of a memory system that supports techniques for firmware enhancement in memory devices in accordance with examples as disclosed herein.

FIG. 5 shows a block diagram 500 of a memory system 520 that supports techniques for firmware enhancement in memory devices in accordance with examples as disclosed herein. The memory system 520 may be an example of aspects of a memory system as described with reference to FIGS. 1 through 4. The memory system 520, or various components thereof, may be an example of means for performing various aspects of techniques for firmware enhancement in memory devices as described herein. For example, the memory system 520 may include a data storage component 525, a command reception component 530, a status transmission component 535, a transfer component 540, an operation queue 545, a selection component 550, an access operation component 555, or any combination thereof. Each of these components may communicate, directly or indirectly, with one another (e.g., via one or more buses).

The data storage component 525 may be configured as or otherwise support a means for storing data in a non-volatile memory device of a memory system, the non-volatile memory device including a first area configured to store a node address mapping and a second area. The command reception component 530 may be configured as or otherwise support a means for receiving a command, from a host system, to transfer a portion of the node address mapping from the non-volatile memory device to a volatile memory device that is associated with firmware of the memory system, the node address mapping including one or more addresses associated with node blocks of the second area. The status transmission component 535 may be configured as or otherwise support a means for transmitting a response, to the host system, to the command indicating a status associated with transferring the portion of the node address mapping.

In some examples, the transfer component 540 may be configured as or otherwise support a means for transferring the portion of the node address mapping from the non-volatile memory device to the volatile memory device based at least in part on receiving the command, where the status associated with transferring the portion includes a successful status based at least in part on transferring the portion.

In some examples, the operation queue 545 may be configured as or otherwise support a means for processing one or more operations associated with one or more commands received prior to the command to transfer the portion, where the status associated with transferring the portion includes a busy status based at least in part on processing the one or more operations over a threshold duration after receiving the command to transfer the portion.

In some examples, the transfer component 540 may be configured as or otherwise support a means for failing to transfer the portion of the node address mapping based at least in part on one or more parameters, where the status associated with transferring the portion includes a failed status based at least in part on failing to transfer the portion.

In some examples, the status transmission component 535 may be configured as or otherwise support a means for transmitting the response including an indication of the one or more parameters, the one or more parameters associated with an illegal request, a hardware error, a power threshold, or any combination thereof.

In some examples, the transfer component 540 may be configured as or otherwise support a means for transferring the portion of the node address mapping from the non-volatile memory device to the volatile memory device based at least in part on receiving the command that includes one or more fields indicating the portion of the node address mapping.

In some examples, the one or more fields indicate a range of addresses associated with the node address mapping or a portion of the range of addresses.

In some examples, the command reception component 530 may be configured as or otherwise support a means for receiving a second command to remove a second portion of the node address mapping from the volatile memory device.

In some examples, the transfer component 540 may be configured as or otherwise support a means for removing the second portion from the volatile memory device based at least in part on one or more fields of the second command indicating the second portion.

In some examples, the command includes an indication of a type of information associated with the portion of the node address mapping.

In some examples, the selection component 550 may be configured as or otherwise support a means for selecting the portion of the node address mapping based at least in part on a frequency of access operations associated with the portion satisfying one or more thresholds.

In some examples, the command includes a field indicating that the firmware associated with the memory system is configured to select the portion, and selecting the portion is based at least in part on the field.

In some examples, the access operation component 555 may be configured as or otherwise support a means for performing one or more access operations using the portion of the node address mapping stored in the volatile memory device. In some examples, the data storage component 525 may be configured as or otherwise support a means for maintaining the portion of the node address mapping in the volatile memory device between operations of the one or more access operations.

Figure 6:
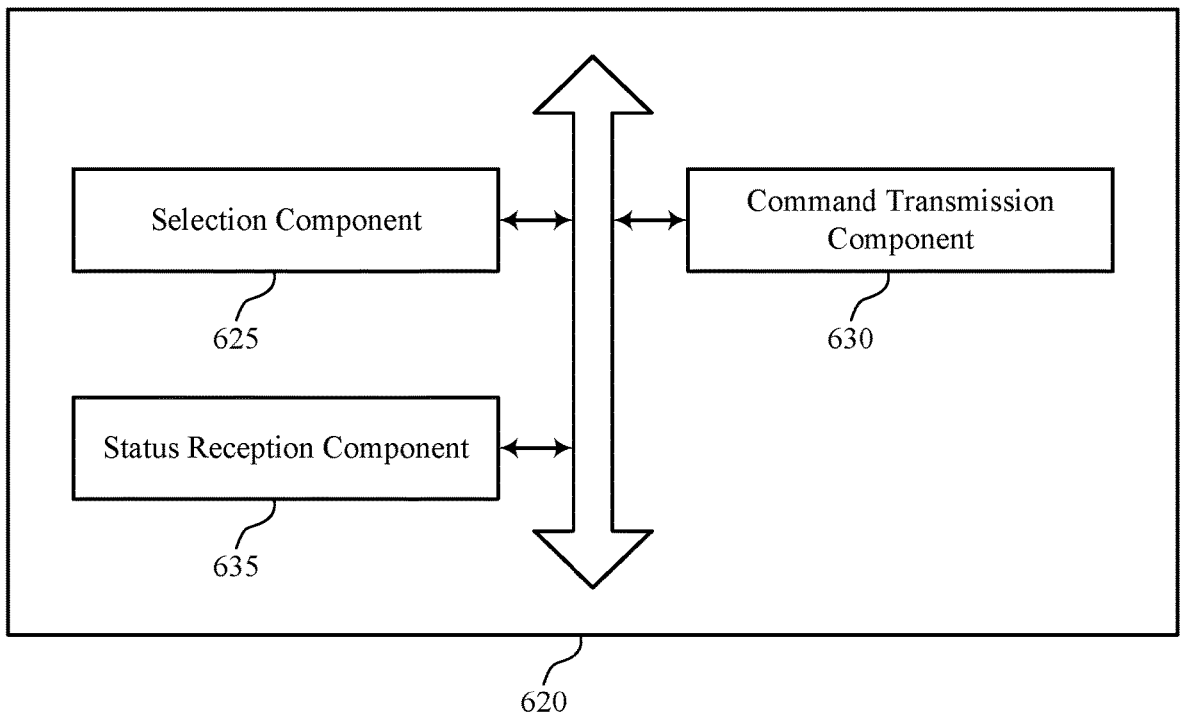
FIG. 6 shows a block diagram of a host system that supports techniques for firmware enhancement in memory devices in accordance with examples as disclosed herein.

FIG. 6 shows a block diagram 600 of a host system 620 that supports techniques for firmware enhancement in memory devices in accordance with examples as disclosed herein. The host system 620 may be an example of aspects of a host system as described with reference to FIGS. 1 through 4. The host system 620, or various components thereof, may be an example of means for performing various aspects of techniques for firmware enhancement in memory devices as described herein. For example, the host system 620 may include a selection component 625, a command transmission component 630, a status reception component 635, or any combination thereof. Each of these components may communicate, directly or indirectly, with one another (e.g., via one or more buses).

The selection component 625 may be configured as or otherwise support a means for selecting a portion of a node address mapping stored in a first area of a non-volatile memory device of a memory system, the memory system having the non-volatile memory device and a volatile memory device. The command transmission component 630 may be configured as or otherwise support a means for transmitting a command, to the memory system, to transfer the portion of the node address mapping to the volatile memory device that is associated with firmware of the memory system, the node address mapping including one or more addresses associated with node blocks of a second area of the non-volatile memory device. The status reception component 635 may be configured as or otherwise support a means for receiving a response to the command indicating a status associated with transferring the portion of the node address mapping.

In some examples, the status includes a successful status indicating that the memory system transferred the portion of the node address mapping to the volatile memory device.

In some examples, the status includes a busy status indicating that the memory system is processing one or more operations associated with one or more commands sent prior to the command to transfer the portion.

In some examples, the status includes a failed status indicating that the memory system failed to transfer the portion of the node address mapping.

In some examples, the command transmission component 630 may be configured as or otherwise support a means for transmitting a second command to transfer the portion of the node address mapping to the volatile memory device in response to receiving the response to the command indicating the failed status.

In some examples, the status reception component 635 may be configured as or otherwise support a means for receiving an indication of one or more parameters associated with the failed status in the response, the one or more parameters associated with an illegal request, a hardware error, a power threshold, or any combination thereof.

In some examples, the selection component 625 may be configured as or otherwise support a means for filling one or more fields of the command based at least in part on selecting the portion of the node address mapping, the one or more fields indicating the portion of the node address mapping.

In some examples, the one or more fields indicate a range of addresses associated with the node address mapping or a portion of the range of addresses.

In some examples, the command transmission component 630 may be configured as or otherwise support a means for transmitting a second command to remove a second portion of the node address mapping from the volatile memory device.

In some examples, the command includes an indication of a type of information associated with the portion of the node address mapping.

In some examples, the selection component 625 may be configured as or otherwise support a means for identifying that the portion of the node address mapping corresponds to a frequency of access operations that satisfies a threshold, where selecting the portion is based at least in part on the satisfied threshold.

Figure 7:
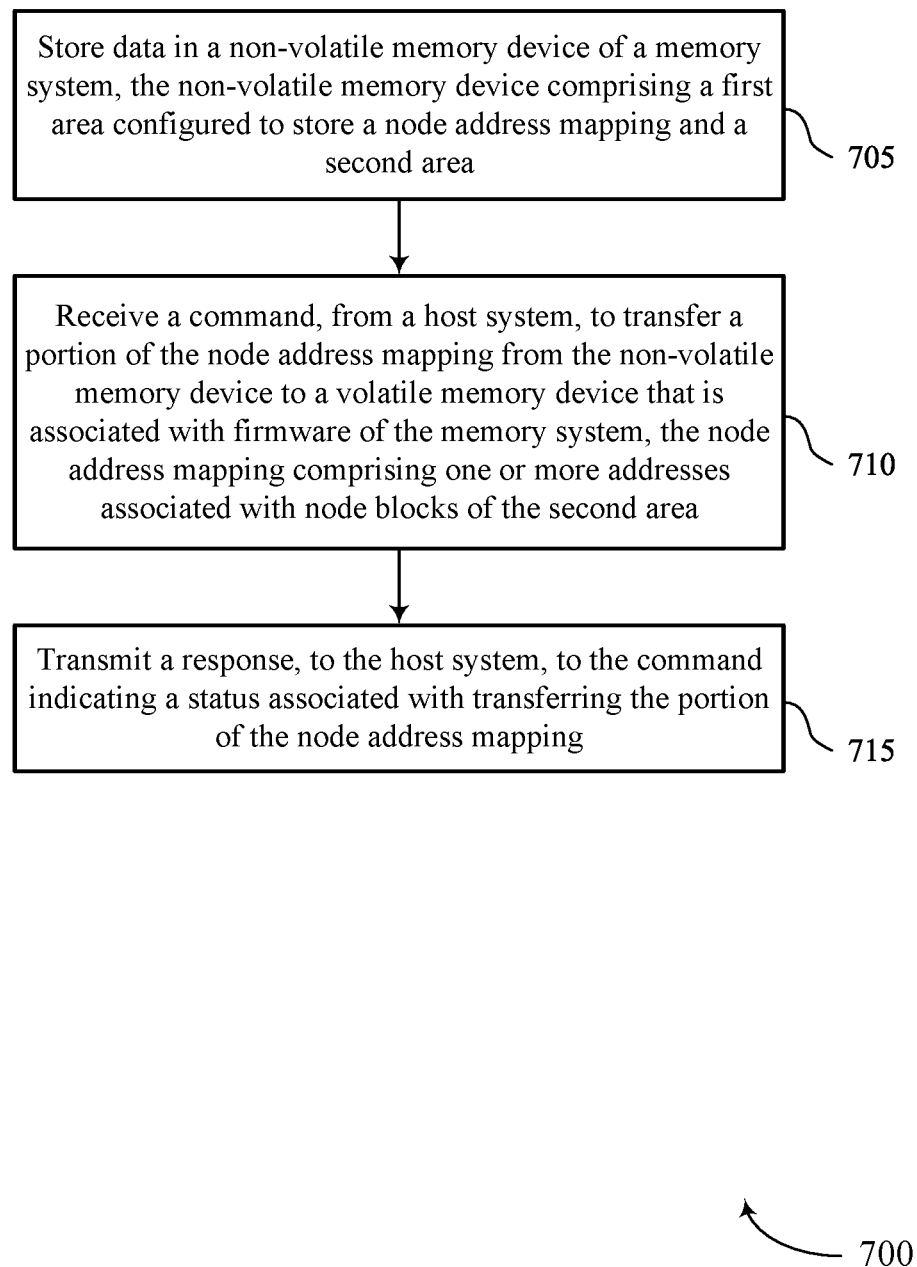
FIGS. 7 and 8 show flowcharts illustrating a method or methods that support techniques for firmware enhancement in memory devices in accordance with examples as disclosed herein.

FIG. 7 shows a flowchart illustrating a method 700 that supports techniques for firmware enhancement in memory devices in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 705, the method may include storing data in a non-volatile memory device of a memory system, the non-volatile memory device including a first area configured to store a node address mapping and a second area. The operations of 705 may be performed in accordance with examples as disclosed herein. In some examples, aspects of the operations of 705 may be performed by a data storage component 525 as described with reference to FIG. 5.

At 710, the method may include receiving a command, from a host system, to transfer a portion of the node address mapping from the non-volatile memory device to a volatile memory device that is associated with firmware of the memory system, the node address mapping including one or more addresses associated with node blocks of the second area. The operations of 710 may be performed in accordance with examples as disclosed herein. In some examples, aspects of the operations of 710 may be performed by a command reception component 530 as described with reference to FIG. 5.

At 715, the method may include transmitting a response, to the host system, to the command indicating a status associated with transferring the portion of the node address mapping. The operations of 715 may be performed in accordance with examples as disclosed herein. In some examples, aspects of the operations of 715 may be performed by a status transmission component 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for storing data in a non-volatile memory device of a memory system, the non-volatile memory device including a first area configured to store a node address mapping and a second area; receiving a command, from a host system, to transfer a portion of the node address mapping from the non-volatile memory device to a volatile memory device that is associated with firmware of the memory system, the node address mapping including one or more addresses associated with node blocks of the second area; and transmitting a response, to the host system, to the command indicating a status associated with transferring the portion of the node address mapping.

Aspect 2: The method, apparatus, or non-transitory computer-readable medium of aspect 1, further including operations, features, circuitry, logic, means, or instructions, or any combination thereof for transferring the portion of the node address mapping from the non-volatile memory device to the volatile memory device based at least in part on receiving the command, where the status associated with transferring the portion includes a successful status based at least in part on transferring the portion.

Aspect 3: The method, apparatus, or non-transitory computer-readable medium of any of aspects 1 through 2, further including operations, features, circuitry, logic, means, or instructions, or any combination thereof for processing one or more operations associated with one or more commands received prior to the command to transfer the portion, where the status associated with transferring the portion includes a busy status based at least in part on processing the one or more operations over a threshold duration after receiving the command to transfer the portion.

Aspect 4: The method, apparatus, or non-transitory computer-readable medium of any of aspects 1 through 3, further including operations, features, circuitry, logic, means, or instructions, or any combination thereof for failing to transfer the portion of the node address mapping based at least in part on one or more parameters, where the status associated with transferring the portion includes a failed status based at least in part on failing to transfer the portion.

Aspect 5: The method, apparatus, or non-transitory computer-readable medium of aspect 4, further including operations, features, circuitry, logic, means, or instructions, or any combination thereof for transmitting the response including an indication of the one or more parameters, the one or more parameters associated with an illegal request, a hardware error, a power threshold, or any combination thereof.

Aspect 6: The method, apparatus, or non-transitory computer-readable medium of any of aspects 1 through 5, further including operations, features, circuitry, logic, means, or instructions, or any combination thereof for transferring the portion of the node address mapping from the non-volatile memory device to the volatile memory device based at least in part on receiving the command that includes one or more fields indicating the portion of the node address mapping.

Aspect 7: The method, apparatus, or non-transitory computer-readable medium of aspect 6 where the one or more fields indicate a range of addresses associated with the node address mapping or a portion of the range of addresses.

Aspect 8: The method, apparatus, or non-transitory computer-readable medium of any of aspects 1 through 7, further including operations, features, circuitry, logic, means, or instructions, or any combination thereof for receiving a second command to remove a second portion of the node address mapping from the volatile memory device and removing the second portion from the volatile memory device based at least in part on one or more fields of the second command indicating the second portion.

Aspect 9: The method, apparatus, or non-transitory computer-readable medium of any of aspects 1 through 8 where the command includes an indication of a type of information associated with the portion of the node address mapping.

Aspect 10: The method, apparatus, or non-transitory computer-readable medium of any of aspects 1 through 9, further including operations, features, circuitry, logic, means, or instructions, or any combination thereof for selecting the portion of the node address mapping based at least in part on a frequency of access operations associated with the portion satisfying one or more thresholds.

Aspect 11: The method, apparatus, or non-transitory computer-readable medium of aspect 10 where the command includes a field indicating that the firmware associated with the memory system is configured to select the portion, and selecting the portion is based at least in part on the field.

Aspect 12: The method, apparatus, or non-transitory computer-readable medium of any of aspects 10 through 11, further including operations, features, circuitry, logic, means, or instructions, or any combination thereof for performing one or more access operations using the portion of the node address mapping stored in the volatile memory device and maintaining the portion of the node address mapping in the volatile memory device between operations of the one or more access operations.

Figure 8:
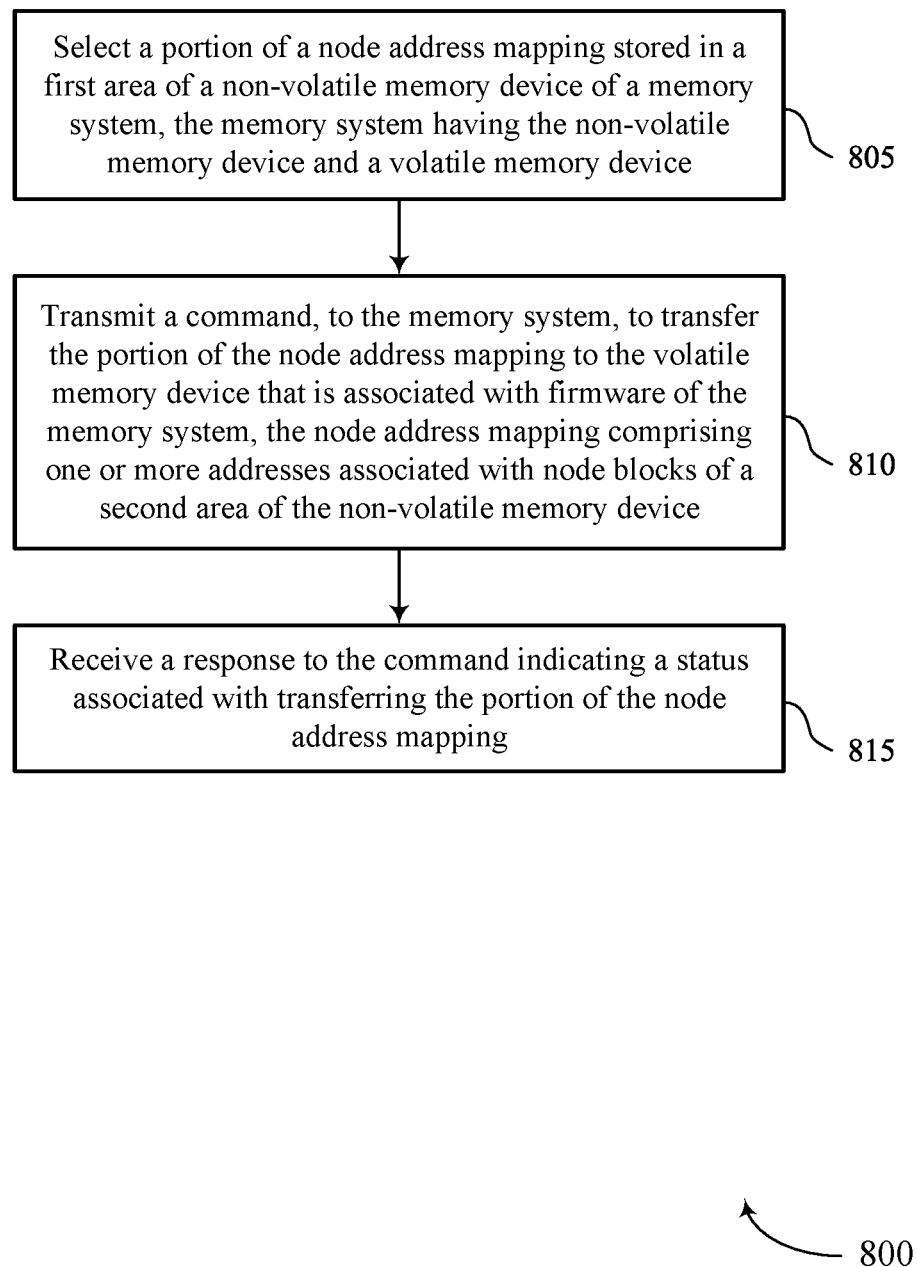

FIG. 8 shows a flowchart illustrating a method 800 that supports techniques for firmware enhancement in memory devices in accordance with examples as disclosed herein. The operations of method 800 may be implemented by a host system or its components as described herein. For example, the operations of method 800 may be performed by a host system as described with reference to FIGS. 1 through 4 and 6. In some examples, a host system may execute a set of instructions to control the functional elements of the device to perform the described functions. Additionally, or alternatively, the host system may perform aspects of the described functions using special-purpose hardware.

At 805, the method may include selecting a portion of a node address mapping stored in a first area of a non-volatile memory device of a memory system, the memory system having the non-volatile memory device and a volatile memory device. The operations of 805 may be performed in accordance with examples as disclosed herein. In some examples, aspects of the operations of 805 may be performed by a selection component 625 as described with reference to FIG. 6.

At 810, the method may include transmitting a command, to the memory system, to transfer the portion of the node address mapping to the volatile memory device that is associated with firmware of the memory system, the node address mapping including one or more addresses associated with node blocks of a second area of the non-volatile memory device. The operations of 810 may be performed in accordance with examples as disclosed herein. In some examples, aspects of the operations of 810 may be performed by a command transmission component 630 as described with reference to FIG. 6.

At 815, the method may include receiving a response to the command indicating a status associated with transferring the portion of the node address mapping. The operations of 815 may be performed in accordance with examples as disclosed herein. In some examples, aspects of the operations of 815 may be performed by a status reception component 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 13: A method, apparatus, or non-transitory computer-readable medium including operations, features, circuitry, logic, means, or instructions, or any combination thereof for selecting a portion of a node address mapping stored in a first area of a non-volatile memory device of a memory system, the memory system having the non-volatile memory device and a volatile memory device; transmitting a command, to the memory system, to transfer the portion of the node address mapping to the volatile memory device that is associated with firmware of the memory system, the node address mapping including one or more addresses associated with node blocks of a second area of the non-volatile memory device; and receiving a response to the command indicating a status associated with transferring the portion of the node address mapping.

Aspect 14: The method, apparatus, or non-transitory computer-readable medium of aspect 13 where the status includes a successful status indicating that the memory system transferred the portion of the node address mapping to the volatile memory device.

Aspect 15: The method, apparatus, or non-transitory computer-readable medium of any of aspects 13 through 14 where the status includes a busy status indicating that the memory system is processing one or more operations associated with one or more commands sent prior to the command to transfer the portion.

Aspect 16: The method, apparatus, or non-transitory computer-readable medium of any of aspects 13 through 15 where the status includes a failed status indicating that the memory system failed to transfer the portion of the node address mapping.

Aspect 17: The method, apparatus, or non-transitory computer-readable medium of aspect 16, further including operations, features, circuitry, logic, means, or instructions, or any combination thereof for transmitting a second command to transfer the portion of the node address mapping to the volatile memory device in response to receiving the response to the command indicating the failed status.

Aspect 18: The method, apparatus, or non-transitory computer-readable medium of any of aspects 16 through 17, further including operations, features, circuitry, logic, means, or instructions, or any combination thereof for receiving an indication of one or more parameters associated with the failed status in the response, the one or more parameters associated with an illegal request, a hardware error, a power threshold, or any combination thereof.

Aspect 19: The method, apparatus, or non-transitory computer-readable medium of any of aspects 13 through 18, further including operations, features, circuitry, logic, means, or instructions, or any combination thereof for filling one or more fields of the command based at least in part on selecting the portion of the node address mapping, the one or more fields indicating the portion of the node address mapping.

Aspect 20: The method, apparatus, or non-transitory computer-readable medium of aspect 19 where the one or more fields indicate a range of addresses associated with the node address mapping or a portion of the range of addresses.

Aspect 21: The method, apparatus, or non-transitory computer-readable medium of any of aspects 13 through 20, further including operations, features, circuitry, logic, means, or instructions, or any combination thereof for transmitting a second command to remove a second portion of the node address mapping from the volatile memory device.

Aspect 22: The method, apparatus, or non-transitory computer-readable medium of any of aspects 13 through 21 where the command includes an indication of a type of information associated with the portion of the node address mapping.

Aspect 23: The method, apparatus, or non-transitory computer-readable medium of any of aspects 13 through 22, further including operations, features, circuitry, logic, means, or instructions, or any combination thereof for identifying that the portion of the node address mapping corresponds to a frequency of access operations that satisfies a threshold, where selecting the portion is based at least in part on the satisfied threshold.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 24: An apparatus, including: a non-volatile memory device; a volatile memory device; and a controller coupled with the non-volatile memory device and the volatile memory device and configured to cause the apparatus to: store data in the non-volatile memory device, the non-volatile memory device including a first area configured to store a node address mapping and a second area; receive a command to transfer a portion of the node address mapping from the non-volatile memory device to the volatile memory device that is associated with firmware of the apparatus, the node address mapping including one or more addresses associated with node blocks of the second area; and transmit a response to the command indicating a status associated with transferring the portion.

Aspect 25: The apparatus of aspect 24, where the controller is further configured to cause the apparatus to: transfer the portion of the node address mapping from the non-volatile memory device to the volatile memory device based at least in part on receiving the command, where the status associated with transferring the portion includes a successful status based at least in part on transferring the portion.

Aspect 26: The apparatus of any of aspects 24 through 25, where the controller is further configured to cause the apparatus to: process one or more operations associated with one or more commands received prior to the command to transfer the portion, where the status associated with transferring the portion includes a busy status based at least in part on processing the one or more operations over a threshold duration after receiving the command to transfer the portion.

Aspect 27: The apparatus of any of aspects 24 through 26, where the controller is further configured to cause the apparatus to: fail to transfer the portion of the node address mapping based at least in part on one or more parameters, where the status associated with transferring the portion includes a failed status based at least in part on failing to transfer the portion.

Aspect 28: The apparatus of aspect 27, where the controller is further configured to cause the apparatus to: transmit the response including an indication of the one or more parameters, the one or more parameters associated with an illegal request, a hardware error, a power threshold, or any combination thereof.

Aspect 29: The apparatus of any of aspects 24 through 28, where the controller is further configured to cause the apparatus to: transfer the portion of the node address mapping from the non-volatile memory device to the volatile memory device based at least in part on receiving the command that includes one or more fields indicating the portion of the node address mapping.

Aspect 30: The apparatus of aspect 29, where the one or more fields indicate a range of addresses associated with the node address mapping or a portion of the range of addresses.

Aspect 31: The apparatus of any of aspects 24 through 30, where the controller is further configured to cause the apparatus to: receive a second command to remove a second portion of the node address mapping from the volatile memory device; and removing the second portion from the volatile memory device based at least in part on one or more fields of the second command indicating the second portion.

Aspect 32: The apparatus of any of aspects 24 through 31, where the command includes an indication of a type of information associated with the portion of the node address mapping.

Aspect 33: The apparatus of any of aspects 24 through 32, where the controller is further configured to cause the apparatus to: select the portion of the node address mapping based at least in part on a frequency of access operations associated with the portion satisfying one or more thresholds.

Aspect 34: The apparatus of aspect 33, where the command includes a field indicating that the firmware associated with the apparatus is configured to select the portion, and selecting the portion is based at least in part on the field.

Aspect 35: The apparatus of any of aspects 33 through 34, further including: performing one or more access operations using the portion of the node address mapping stored in the volatile memory device; and maintaining the portion of the node address mapping in the volatile memory device between operations of the one or more access operations.

An apparatus is described. The following provides an overview of aspects of the apparatus as described herein:

Aspect 36: An apparatus, including: a controller configured to cause the apparatus to: select a portion of a node address mapping stored in a first area of a non-volatile memory device of a memory system, the memory system having the non-volatile memory device and a volatile memory device; transmit a command to transfer the portion of the node address mapping to the volatile memory device that is associated with firmware of the memory system, the node address mapping including one or more addresses associated with node blocks of a second area of the non-volatile memory device; and receive a response to the command indicating a status associated with transferring the portion.

Aspect 37: The apparatus of aspect 36, where the status includes a successful status indicating that the memory system transferred the portion of the node address mapping to the volatile memory device.

Aspect 38: The apparatus of any of aspects 36 through 37, where the status includes a busy status indicating that the memory system is processing one or more operations associated with one or more commands sent prior to the command to transfer the portion.

Aspect 39: The apparatus of any of aspects 36 through 38, where the status includes a failed status indicating that the memory system failed to transfer the portion of the node address mapping.

Aspect 40: The apparatus of aspect 39, where the controller is further configured to cause the apparatus to: transmit a second command to transfer the portion of the node address mapping to the volatile memory device in response to receiving the response to the command indicating the failed status.

Aspect 41: The apparatus of any of aspects 39 through 40, where the controller is further configured to cause the apparatus to: receive an indication of one or more parameters associated with the failed status in the response, the one or more parameters associated with an illegal request, a hardware error, a power threshold, or any combination thereof.

Aspect 42: The apparatus of any of aspects 36 through 41, where the controller is further configured to cause the apparatus to: filling one or more fields of the command based at least in part on selecting the portion of the node address mapping, the one or more fields indicating the portion of the node address mapping.

Aspect 43: The apparatus of aspect 42, where the one or more fields indicate a range of addresses associated with the node address mapping or a portion of the range of addresses.

Aspect 44: The apparatus of any of aspects 36 through 43, where the controller is further configured to cause the apparatus to: transmit a second command to remove a second portion of the node address mapping from the volatile memory device.

Aspect 45: The apparatus of any of aspects 36 through 44, where the command includes an indication of a type of information associated with the portion of the node address mapping.

Aspect 46: The apparatus of any of aspects 36 through 45, where the controller is further configured to cause the apparatus to: identify that the portion of the node address mapping corresponds to a frequency of access operations that satisfies a threshold, where selecting the portion is based at least in part on the satisfied threshold.

An apparatus is described. The following provides an overview of aspects of the apparatus as described herein:

Aspect 47: An apparatus, including: a non-volatile memory device configured to store data of the apparatus, the non-volatile memory device including a plurality of areas associated with respective ranges of addresses; a volatile memory device coupled with firmware of the apparatus; and a controller operable to transfer a portion of a node address mapping stored in a first area of the non-volatile memory device from the non-volatile memory device to the volatile memory device, the node address mapping including one or more addresses associated with node blocks of a second area of the plurality of areas.

Aspect 48: The apparatus of aspect 47, where: a file system layout associated with the non-volatile memory device, the file system layout indicating an index for each area of the plurality of areas, the plurality of areas including the first area storing the node address mapping, the second area storing data associated with a host system, a third area storing checkpoint data, a fourth area storing a segment information table, a fifth area storing a segment summary area, or any combination thereof.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit associated with the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   a non-volatile memory device;
   a volatile memory device; and
   one or more controllers coupled with the non-volatile memory device and the volatile memory device and configured to cause the memory system to:
      store data in the non-volatile memory device, the non-volatile memory device comprising a first area configured to store a node address mapping and a second area;
      receive, at the memory system, a command to transfer a portion of the node address mapping from the non-volatile memory device to the volatile memory device that is associated with firmware of the memory system, the node address mapping comprising data indicating a range of address mappings associated with identifying data in node blocks of the second area; and
      transmit, from the memory system, a response to the command indicating a status associated with transferring the portion of the node address mapping from the non-volatile memory device to the volatile memory device.

2. The memory system of claim 1, wherein the one or more controllers are further configured to cause the memory system to:
   transfer the portion of the node address mapping from the non-volatile memory device to the volatile memory device based at least in part on receiving the command, wherein the status associated with transferring the portion comprises a successful status based at least in part on transferring the portion.

3. The memory system of claim 1, wherein the one or more controllers are further configured to cause the memory system to:
   process one or more operations associated with one or more commands received prior to the command to transfer the portion, wherein the status associated with transferring the portion comprises a busy status based at least in part on processing the one or more operations over a threshold duration after receiving the command to transfer the portion.

4. The memory system of claim 1, wherein the one or more controllers are further configured to cause the memory system to:
   receive a second command to remove a second portion of the node address mapping from the volatile memory device; and
   remove the second portion from the volatile memory device based at least in part on one or more fields of the second command indicating the second portion.

5. The memory system of claim 1, wherein the command comprises an indication of a type of information associated with the portion of the node address mapping.

6. The memory system of claim 1, wherein the one or more controllers are further configured to cause the memory system to:
   fail to transfer the portion of the node address mapping based at least in part on one or more parameters, wherein the status associated with transferring the portion comprises a failed status based at least in part on failing to transfer the portion.

7. The memory system of claim 6, wherein the one or more controllers are further configured to cause the memory system to:
   transmit the response comprising an indication of the one or more parameters, the one or more parameters associated with an illegal request, a hardware error, a power threshold, or any combination thereof.

8. The memory system of claim 6, wherein the one or more controllers are configured to cause the memory system to:
   receive a second command to transfer the portion of the node address mapping to the volatile memory device based at least in part on transmitting the response comprising the failed status.

9. The memory system of claim 1, wherein the one or more controllers are further configured to cause the memory system to:
   transfer the portion of the node address mapping from the non-volatile memory device to the volatile memory device based at least in part on the command comprising one or more fields indicating the portion of the node address mapping.

10. The memory system of claim 9, wherein the one or more fields indicate a range of addresses associated with the node address mapping or a portion of the range of addresses.

11. The memory system of claim 1, wherein the one or more controllers are further configured to cause the memory system to:
    select the portion of the node address mapping based at least in part on a frequency of access operations associated with the portion satisfying one or more thresholds.

12. The memory system of claim 11, wherein the command comprises a field indicating that the firmware associated with the memory system is configured to select the portion, and selecting the portion is based at least in part on the field.

13. The memory system of claim 11, wherein the one or more controllers are further configured to cause the memory system to:
perform one or more access operations using the portion of the node address mapping stored in the volatile memory device; and
maintain the portion of the node address mapping in the volatile memory device between operations of the one or more access operations.

14. A non-transitory computer-readable medium storing code comprising instructions which, when executed by one or more processors of a memory system, cause the memory system to:
store data in a non-volatile memory device of the memory system, the non-volatile memory device comprising a first area configured to store a node address mapping and a second area;
receive, at the memory system, a command to transfer a portion of the node address mapping from the non-volatile memory device to a volatile memory device that is associated with firmware of the memory system, the node address mapping comprising data indicating a range of address mappings associated with identifying data in node blocks of the second area; and
transmit, from the memory system, a response to the command indicating a status associated with transferring of the portion of the node address mapping from the non-volatile memory device to the volatile memory device.

15. The non-transitory computer-readable medium of claim 14, wherein the instructions, when executed by the one or more processors of the memory system, further cause the memory system to:
transfer the portion of the node address mapping from the non-volatile memory device to the volatile memory device based at least in part on receiving the command, wherein the status associated with transferring the portion comprises a successful status based at least in part on transferring the portion.

16. The non-transitory computer-readable medium of claim 14, wherein the instructions, when executed by the one or more processors of the memory system, further cause the memory system to:
process one or more operations associated with one or more commands received prior to the command to transfer the portion, wherein the status associated with transferring the portion comprises a busy status based at least in part on processing the one or more operations over a threshold duration after receiving the command to transfer the portion.

17. The non-transitory computer-readable medium of claim 14, wherein the instructions, when executed by the one or more processors of the memory system, further cause the memory system to:
receive a second command to remove a second portion of the node address mapping from the volatile memory device; and
remove the second portion from the volatile memory device based at least in part on one or more fields of the second command indicating the second portion.

18. The non-transitory computer-readable medium of claim 14, wherein the command comprises an indication of a type of information associated with the portion of the node address mapping.

19. The non-transitory computer-readable medium of claim 14, wherein the instructions, when executed by the one or more processors of the memory system, further cause the memory system to:
fail to transfer the portion of the node address mapping based at least in part on one or more parameters, wherein the status associated with transferring the portion comprises a failed status based at least in part on failing to transfer the portion.

20. The non-transitory computer-readable medium of claim 19, wherein the instructions, when executed by the one or more processors of the memory system, further cause the memory system to:
transmit the response comprising an indication of the one or more parameters, the one or more parameters associated with an illegal request, a hardware error, a power threshold, or any combination thereof.

21. The non-transitory computer-readable medium of claim 14, wherein the instructions, when executed by the one or more processors of the memory system, further cause the memory system to:
transfer the portion of the node address mapping from the non-volatile memory device to the volatile memory device based at least in part on the command comprising one or more fields indicating the portion of the node address mapping.

22. The non-transitory computer-readable medium of claim 21, wherein the one or more fields indicate a range of addresses associated with the node address mapping or a portion of the range of addresses.

23. The non-transitory computer-readable medium of claim 14, wherein the instructions, when executed by the one or more processors of the memory system, further cause the memory system to:
select the portion of the node address mapping based at least in part on a frequency of access operations associated with the portion satisfying one or more thresholds.

24. The non-transitory computer-readable medium of claim 23, wherein the command comprises a field indicating that the firmware associated with the memory system is configured to select the portion, and selecting the portion is based at least in part on the field.

25. A method by a memory system, comprising:
storing data in a non-volatile memory device of the memory system, the non-volatile memory device comprising a first area configured to store a node address mapping and a second area;
receiving, at the memory system, a command to transfer a portion of the node address mapping from the non-volatile memory device to a volatile memory device that is associated with firmware of the memory system, the node address mapping comprising data indicating a range of address mappings associated with identifying data in node blocks of the second area; and
transmitting, from the memory system, a response to the command indicating a status associated with transferring the portion of the node address mapping from the non-volatile memory device to the volatile memory device.

* * * * *